(12) United States Patent
Eigler et al.

(10) Patent No.: US 7,452,199 B2
(45) Date of Patent: Nov. 18, 2008

(54) APPARATUS FOR INJECTION MOLDING

(75) Inventors: Frank J. Eigler, Windsor (CA); Donald Brohl, Rav, MI (US); Doug Hugo, Clyde Township, MI (US)

(73) Assignee: D-M-E Company, Madison Heights, MI (US)

( * ) Notice: Subject to any disclaimer, the term of this patent is extended or adjusted under 35 U.S.C. 154(b) by 222 days.

(21) Appl. No.: 11/640,049

(22) Filed: Dec. 15, 2006

(65) Prior Publication Data

US 2008/0145473 A1    Jun. 19, 2008

(51) Int. Cl.
B29C 45/17 (2006.01)
(52) U.S. Cl. ............... 425/190; 264/328.8; 425/572
(58) Field of Classification Search ......... 425/572, 425/588, 190; 264/328.8
See application file for complete search history.

(56) References Cited

U.S. PATENT DOCUMENTS

| | | | |
|---|---|---|---|
| 3,843,295 | A | 10/1974 | Greenberg et al. |
| 4,299,791 | A | 11/1981 | Aoki |
| 5,012,839 | A | 5/1991 | Rogers et al. |
| 5,183,621 | A * | 2/1993 | Yukihiro et al. .......... 264/328.8 |
| 5,229,145 | A * | 7/1993 | Brown et al. ............. 425/572 |
| 5,370,523 | A | 12/1994 | Kushnir |
| 5,458,843 | A | 10/1995 | Brown et al. |
| 5,484,275 | A | 1/1996 | Kushnir |
| 5,846,472 | A * | 12/1998 | Rozema et al. ........... 425/588 |
| 6,409,955 | B1 | 6/2002 | Schmitt et al. |
| 6,575,731 | B1 | 6/2003 | Olaru et al. |
| 6,602,456 | B2 * | 8/2003 | Steger et al. ............. 264/328.8 |
| 6,779,999 | B2 * | 8/2004 | Ciccone ................... 425/588 |
| 6,852,265 | B2 * | 2/2005 | Olaru et al. ............. 264/328.8 |

FOREIGN PATENT DOCUMENTS

| | | |
|---|---|---|
| WO | 0139953 | 6/2001 |
| WO | 2006/062539 | 6/2006 |
| WO | 2007/055746 | 5/2007 |

OTHER PUBLICATIONS

International Search Report from PCT/US2007/017962 forwarded with Notification dated Dec. 18, 2007; International Searching Authority: European Patent Office.
Written Opinion of the International Searching Authority forwarded with Notification dated Dec. 18, 2007; International Searching Authority: European Patent Office.

* cited by examiner

*Primary Examiner*—Tim Heitbrink
(74) *Attorney, Agent, or Firm*—John W. Gregg

(57) ABSTRACT

An apparatus for conducting melt in stack mold arrangements comprises at least one tubular body having a passage there through for conveying melt, an interface member mounted to at least one tubular body at a terminus of the passage for conducting melt between the tubular body and a mating mold member engaged by the interface member, and a length adjusting device interposed between the interface member and the tubular body and having a wedge member and means for setting the transverse position of the wedge member relative to the longitudinal axis of the tubular body whereby the overall length of the combined tubular body and interface member is established. A sprue bar assembly comprises a sprue bar segment, a nozzle and a length adjusting device interposed between the nozzle and the sprue bar segment having an adjustable wedge member for establishing the overall length of the sprue bar assembly.

20 Claims, 5 Drawing Sheets

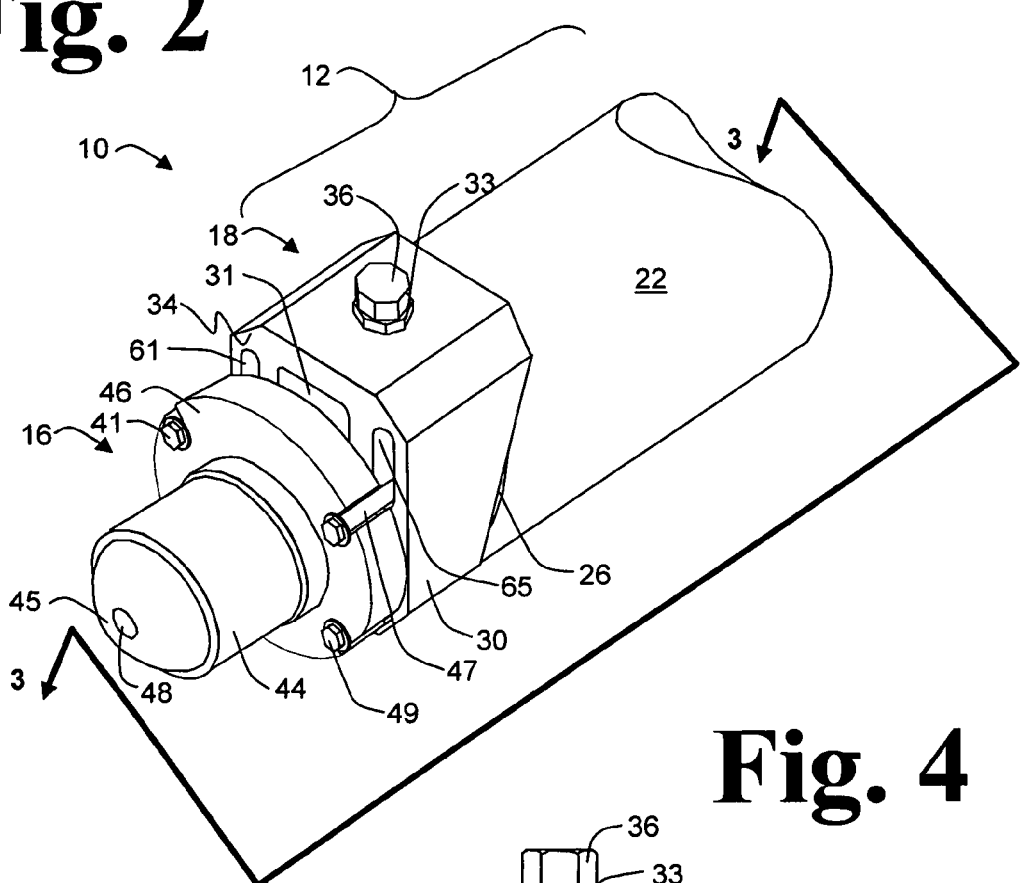
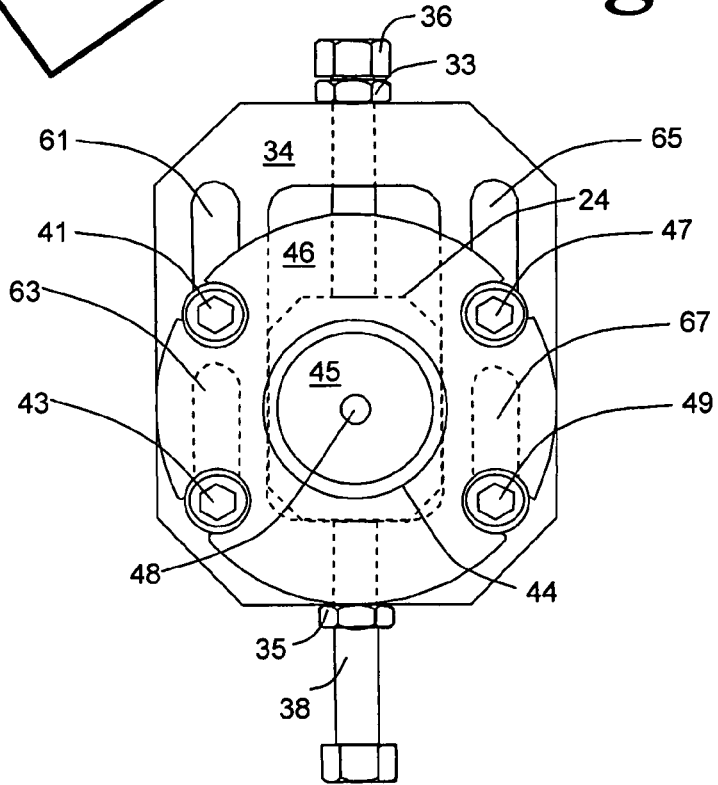

APPARATUS FOR INJECTION MOLDING

I. BACKGROUND OF THE INVENTION

1. Field of the Invention

This invention relates generally to injection molding and particularly to apparatus for conducting melt to mold cavities in a stack mold arrangement.

2. Description of Related Art

Injection molding is a cyclic process wherein mold assemblies defining mold cavities are operable between "open" and "closed" conditions, the open condition permitting release of molded articles and the closed condition permitting filling of the cavities with material to be molded. Mold assemblies comprise mating mold components comprising a primary core component and primary cavity component, the primary core component and primary cavity component meeting along a so called "parting line" when the mold assembly is closed. The mating mold components define cavities establishing the shape and size of articles to be molded. A mold assembly within the press unit of a molding machine is illustrated in FIG. 1a. Filling of cavities is effected by forcing flowable material, e.g. molten metal, rubber or thermoplastic (known as "melt"), from an injection unit through conduits to the mold cavities. Once filled, the mold assembly is held closed while the molten material solidifies and is opened to allow removal of molded articles when the material has sufficiently solidified to retain the molded form without unacceptable distortion when the material is unsupported.

Improved productivity of injection molding is achieved by providing mold arrangements comprising plural mold assemblies having plural parting lines within a single injection molding machine mold clamping unit. In such arrangements mating mold components are carried on intermediate movable platens interposed between a stationary platen and a primary movable platen defining the machine clamping unit of the injection molding machine. Such arrangements are known as "stack molds" or "dual molds" and FIG. 1b illustrates such a mold arrangement in the press unit of a molding machine. Melt is conveyed from the injection unit to the mold cavities through conduits that must accommodate cyclic separation and joining of the mating mold components. Such conduits are sometimes referred to as sprue bars.

II. SUMMARY OF THE INVENTION

It is an object of the present invention to provide an apparatus for conveying melt to mold cavities in an arrangement of plural mold assemblies wherein mating mold components are simultaneously abutted and separated by movement of supports in a direction parallel to a mold longitudinal axis and the apparatus is abutted with and separated from at least one mating mold member with abutment and separation of mating mold components, the apparatus comprising at least one tubular body having a passage there through providing fluid communication between a source of melt and a plurality of mold cavities, an interface member mounted to at least one tubular body at a terminus of the passage and having a nozzle passage there through for conducting melt between the tubular body and a mating mold member, and a length adjusting device interposed between the interface member and the tubular body, the length adjusting device comprising a wedge member, and means for setting the transverse position of the wedge member relative to the longitudinal axis of the tubular body whereby the overall length of the combined tubular body and interface member is established.

It is a further object of the present invention to provide a sprue bar assembly for conducting melt to mold cavities in an arrangement of plural mold assemblies wherein mating mold components are simultaneously abutted and separated by movement of supports in a direction parallel to a mold longitudinal axis and the sprue bar assembly is abutted with and separated from a mating member with abutment and separation of mating mold components, the sprue bar assembly comprising a sprue bar segment, a nozzle and a length adjusting device interposed between the nozzle and the sprue bar segment, the sprue bar segment comprising a tubular body having a passage there through providing fluid communication between a source of melt and a plurality of mold cavities, the nozzle having a nozzle passage there through for conducting melt between the sprue bar assembly and a mold interface member, the length adjusting device comprising a wedge member and means for setting the transverse position of the wedge member relative to the longitudinal axis of the sprue bar assembly whereby the overall length of the sprue bar assembly is established.

Further objects and advantages of the invention shall be made apparent from the accompanying drawings and the following description thereof.

In accordance with the aforesaid objects the present invention provides an apparatus for conveying melt to mold cavities, the mold cavities being defined by plural pairs of mating mold components, each mating mold component comprising a mold assembly, plural mold assemblies being supported so that mating mold components of the plural mold assemblies are simultaneously abutted and separated by movement of supports in a direction parallel to a mold longitudinal axis and the apparatus being abutted with and separated from at least one mating mold member with abutment and separation of mating mold components, the apparatus comprising at least one tubular body having a passage there through providing fluid communication between a source of melt and a plurality of mold cavities, an interface member mounted to at least one tubular body at a terminus of the passage for engaging a mating mold member and having a nozzle passage there through for conducting melt between the tubular body and the mating mold member, and a length adjusting device interposed between the interface member and the tubular body, the length adjusting device comprising a wedge member having a wedge first surface oblique to the longitudinal axis of the tubular body for abutting an adjustment surface, the adjustment surface being oblique to the longitudinal axis of the tubular body, and a wedge second surface perpendicular to the longitudinal axis of the tubular body, and means for setting the transverse position of the wedge member relative to the longitudinal axis of the tubular body to establish the position of the wedge second surface relative to the adjustment surface whereby the overall length of the combined tubular body and interface member is established. A sprue bar assembly in accordance with the invention comprises a sprue bar segment, a nozzle and a length adjusting device interposed between the nozzle and the sprue bar segment, the sprue bar segment comprising a tubular body having a passage there through providing fluid communication between a source of melt and a plurality of mold cavities, the nozzle having a nozzle passage there through for conducting melt between the sprue bar assembly and a mold interface member engaged by the sprue bar assembly when mating mold components are abutted, a shank portion received in the passage, a nose portion for engaging a mating mold interface member when mating mold components are abutted and a flange intermediate the nose portion and the shank portion, the length adjusting device comprising a wedge member having a wedge first surface oblique to the axis of adjustment for abutting an adjustment surface, the adjustment surface being oblique to the longitudinal axis of the sprue bar assembly, a wedge second surface perpendicular to the axis of adjustment and means for setting the transverse position of the wedge member relative to the longitudinal axis of the sprue bar assembly to establish the position of the second surface relative to the adjustment surface, whereby the overall length of the sprue bar assembly is established by setting the transverse position of the wedge member relative to the longitudinal axis of the sprue bar assembly.

III. BRIEF DESCRIPTION OF THE DRAWINGS

FIG. 2 is a three dimensional view of a portion of a sprue bar assembly in accordance with the invention.

FIG. 4 is an end view of the sprue bar assembly of FIG. 2.

IV. DETAILED DESCRIPTION OF THE PREFERRED EMBODIMENT

Figure 1A:
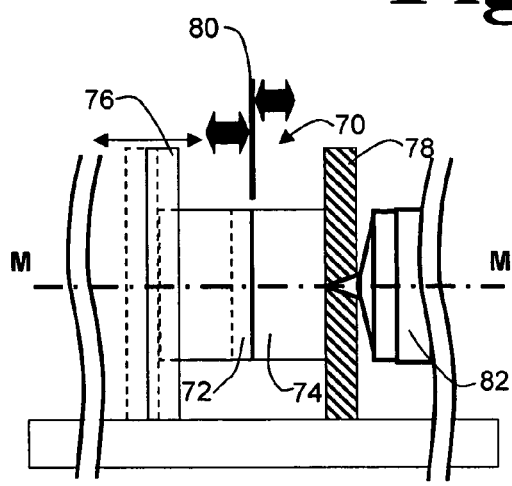
FIGS. 1a and 1b illustrate mold assemblies within press units of molding machines.

Referring to FIG. 1a, a mold assembly 70 comprises a primary core component 72 and a primary cavity component 74. Primary core component 72 is supported by movable platen 76, and primary cavity component 74 is supported by stationary platen 78. Mold assembly 70 has parting line 80. Movable platen 76 and stationary platen 78 comprise a press unit of an injection molding machine. Movable platen 76 is moved in a direction parallel to mold longitudinal axis MM to open and close mold assembly 70, an open position of movable platen 76 being shown in phantom (dashed line) in FIG. 1a. Melt is injected to mold assembly 70 from an injection unit 82, admitting melt through a passage in stationary platen 78 as illustrated by the cross-section thereof shown in FIG. 1a. Primary core component 72 and primary cavity component 74 advantageously define plural mold cavities (not shown). Distribution of melt to those cavities is advantageously effected by a configuration of conduits and nozzles (not shown in FIG. 1a) receiving melt at the passage through stationary platen 78 and conveying melt through the nozzles to the cavities.

Figure 1B:
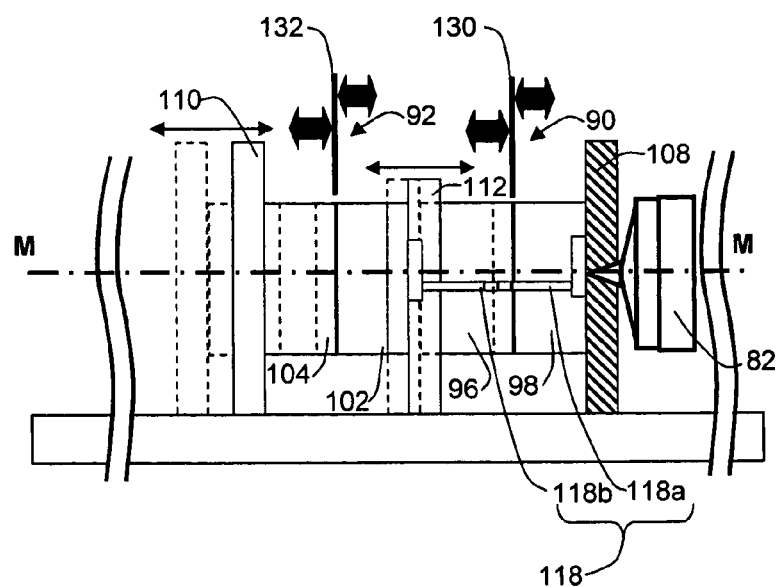

Referring to FIG. 1b, mold assemblies 90 and 92 have parting lines 130 and 132, respectively; mold assembly 90 comprises primary core component 96 and primary cavity component 98 and mold assembly 92 comprises primary core component 104 and primary cavity component 102. Movable platen 110 and stationary platen 108, together with intermediate movable platen 112 comprise a press unit of an injection molding machine. Movable platen 110, movable intermediate platen 112 are moved in a direction parallel to mold longitudinal axis MM to open and close mold assemblies 90 and 92, an open position of movable paten 110 and intermediate movable platen 112 is shown in phantom (dashed line) in FIG. 1b. Primary cavity component 98 is supported by stationary platen 108, primary core component 104 is supported by movable platen 110, and primary cavity component 102 and primary core component 96 are supported by intermediate movable platen 112. Melt is injected from injection unit 82 via a passage through or conduit around stationary platen 108 to mold assembly 90 and mold cavities defined thereby (not shown) and via conduit pair 118a and 118b comprising conduit 118 through junction 136 to conduits comprising mold assembly 92 and mold cavities defined thereby (not shown). Conduit pair 118a and 118b comprise so call "sprue bar" segments, the segments of each pair separating and abutting with operation of the stack mold assembly. Sprue bar segments may be arranged to pass through fixed and movable platens, and hence through supports for mating mold components or to be supported outside the fixed and movable platens and hence outside supports for mating mold components. Although illustrated as meeting proximate the mold parting line 130, the segments of the conduit pair may meet anywhere within the length between the supports for the segments. Heaters are advantageously applied to conduit 118 as well as conduits comprising intermediate platen 112 to maintain a flowable state of melt contained therein throughout a molding cycle.

In mold arrangements of FIG. 1b, spacing establishing the length of segments of sprue bar pair 118a and 118b is dependent in part on the overall dimension known as "shut height" of mold components mating on the parting lines as measured parallel to the direction of travel of movable platens. Adjustment of length of sprue bar assemblies is desirable to accommodate a range of shut height of mating mold components as used in the mold assemblies permitting use of a single sprue bar assembly for a variety of mold components. Furthermore, length adjustment permits accommodation of changes of mold shut height as a consequence of refurbishing of mold components that have worn through use. Sprue bar assemblies in accordance with the invention are advantageously applied in opposed fashion, one having an interface member with a convex seating surface and one having an interface member with a concave seating surface, the opposed seating surfaces of the interface members are abutted when mating mold components of a mold assembly are abutted, i.e., when a mold assembly is closed. The abutted seating surfaces of the interface members seal against escape of melt pressurized during the molding process.

Figure 3:
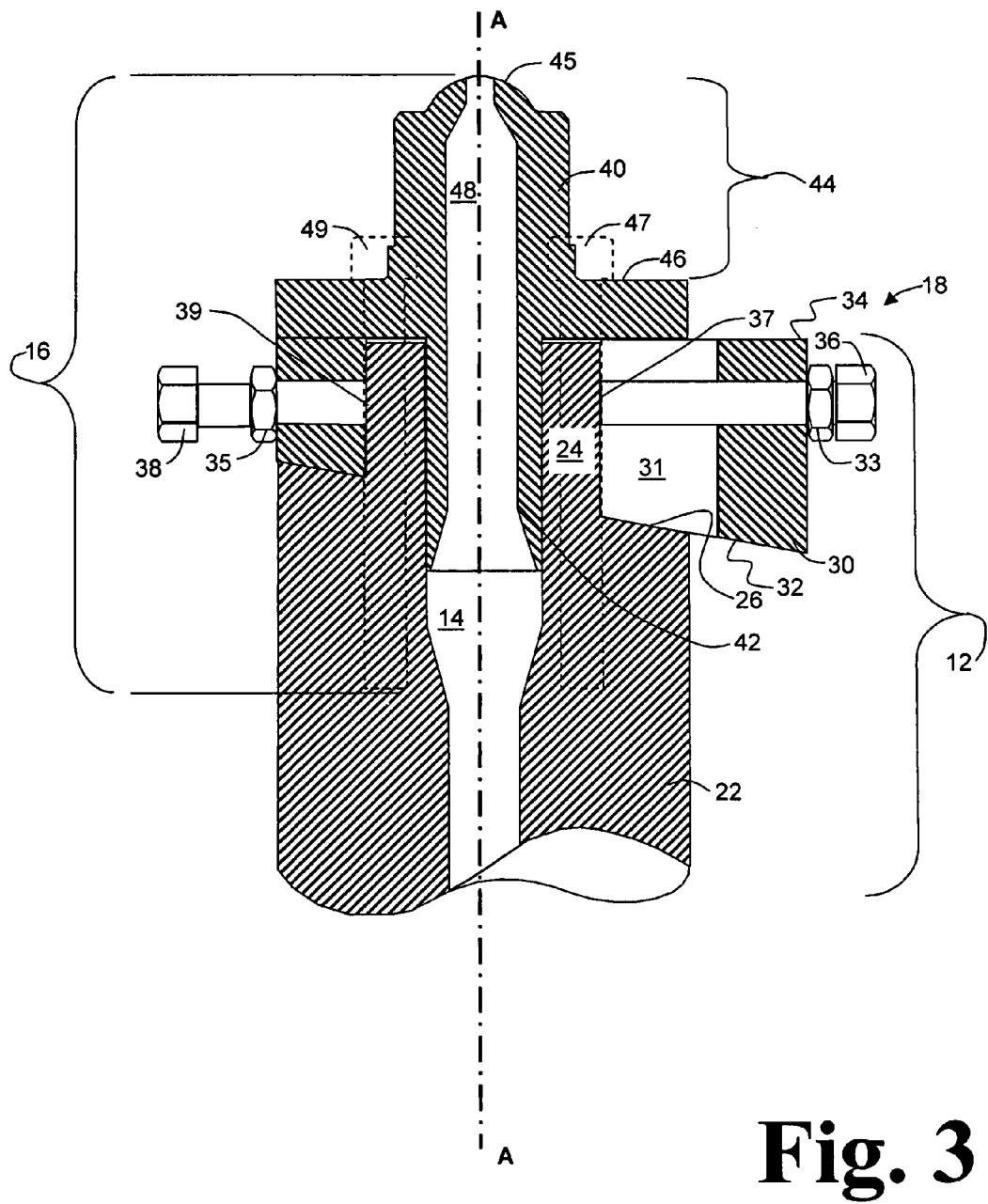
FIG. 3 is a partial sectional view of the sprue bar assembly taken along section line 3-3 of FIG. 2.

Referring to FIGS. 2, 3 and 4, a sprue bar assembly 10 comprises a sprue bar segment 12 having a passage 14 there through for providing fluid communication between a source of melt and mold cavities, an interface member 16 having a nozzle passage 48 in fluid communication with passage 14 and a length adjusting device 18. Sprue bar segment 12 comprises tubular body 22 having a stud portion 24 proximate a terminus of passage 14. Stud portion 24 projects beyond adjustment surface 26 of tubular body 22, adjustment surface 26 being oblique to the longitudinal axis AA of sprue bar assembly 10. Length adjusting device 18 comprises wedge member 30 having base or first surface 32 oblique to the length adjusting axis BB of length adjusting device 18 and wedge seating or second surface 34 perpendicular to the length adjusting axis BB. Interface member 16 is attached to tubular body 22 by fasteners such as bolts 41, 43, 47 and 49 passing through clearance openings in interface member 16 and slots 61, 63, 65 and 67, respectively, of wedge member 30 and threaded into tubular body 22 outside stud portion 24. Means for adjusting the transverse position of wedge member 30 relative to the longitudinal axis of sprue bar assembly 10 such as bolts 36 and 38 threadably engage wedge member 30 and extend into opening 31 with ends, such as ends 37 and 39 abutting opposite sides of stud portion 24. Transverse position of wedge member 30 is established by the relative projection of bolts 36 and 38 into opening 31. Slots 61, 63, 65 and 67 permit wedge member 30 to be positioned relative to fasteners 41, 43, 47 and 49 attaching interface member 16 to tubular body 22. Lock nuts 33 and 35 are advantageously applied to maintain the relative projection of bolts 36 and 38 once set, preventing bolts 36 and 38 from being moved as a consequence of vibration or thermally induced dimensional changes of the engaged threads.

Figure 5A:
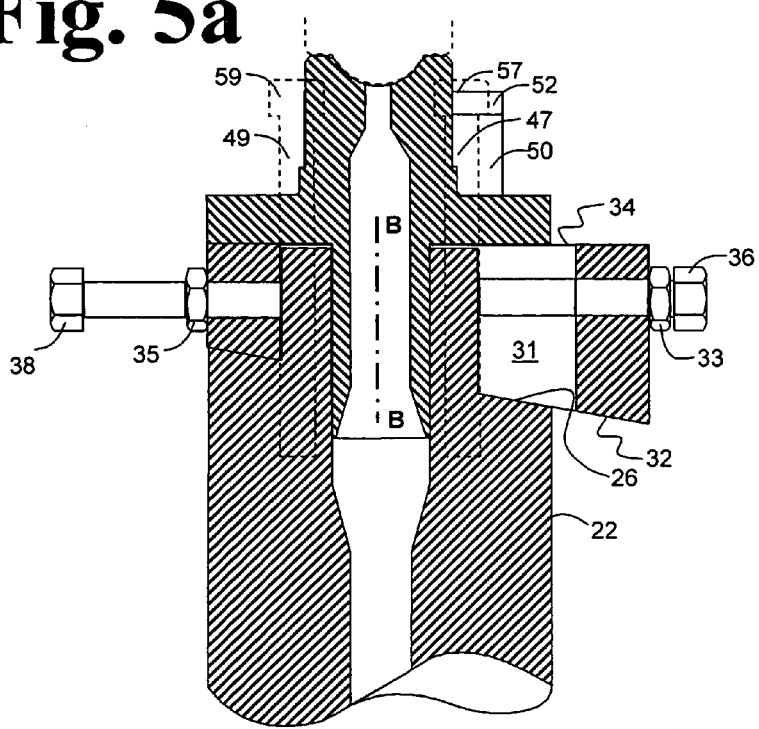
FIGS. 5a and 5b are partial sectional views of a portion of a sprue bar assembly in accordance with the invention with an alternative interface member.
Figure 5B:
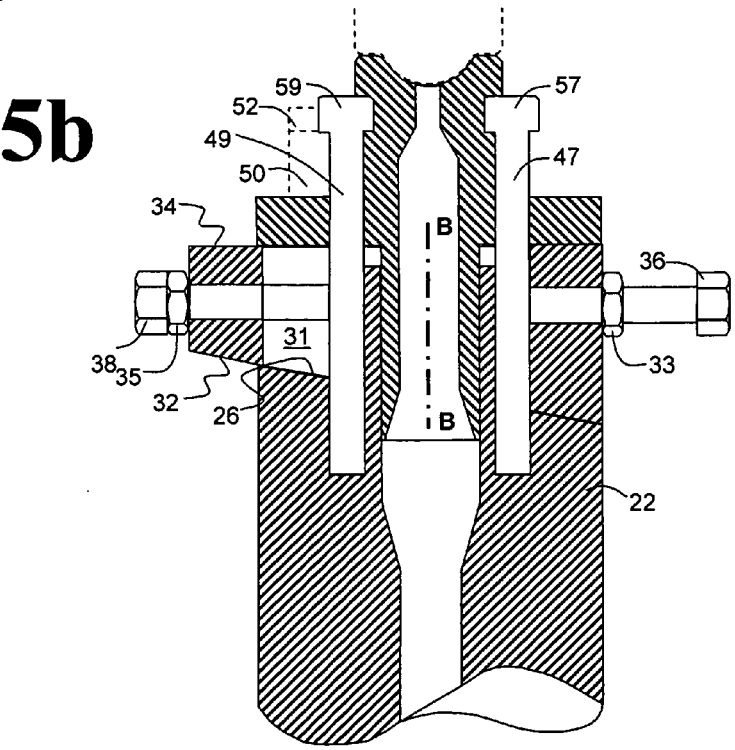

Interface member 16 advantageously comprises a nozzle for effecting a change of the rate of flow of melt as it passes through the nozzle. As illustrated in the accompanying drawings, a nozzle comprises a nozzle body 40 having a shank portion 42 received within passage 14 at stud portion 24, a nose portion 44 for engaging a mating mold interface member when mating mold components are abutted, and a flange 46 intermediate nose portion 44 and stud portion 24. Nozzle passage 48 advantageously includes at least one change of diameter to effect a change of the rate of flow of melt through nozzle body 40. Nose portion 44 comprises a nozzle seating surface 45 to engage a mating interface member in a sealed manner when mating mold components are abutted. The sealing engagement prevents leakage of melt from the engaged members. Seating surface 45 may be convex (as illustrated in FIGS. 2, 3 and 4) or concave as illustrated in FIGS. 5a and 5b. The mating interface member (shown in dashed lines in FIGS. 5a and 5b) will have a mating sealing surface (a portion of a mating mold interface member is shown dashed in FIGS. 5a and 5b and abutted with sealing surface 45 of interface member 16). As shown in FIGS. 3 and 4, nozzle body 40 is fastened to sprue bar segment 12 by fasteners, such as bolts 47 and 49, so that flange 46 abuts wedge seating or second surface 34. An alternative arrangement is illustrated in FIGS. 5a and 5b wherein nozzle body 40 is retained so as to be extendible relative to sprue bar segment 12.

Overall length of sprue bar assembly 10 is adjusted by setting the position of wedge seating or second surface 34 along length adjustment axis BB. The position of wedge seating or second surface 34 is determined by the slope of wedge base or first surface 32 relative to longitudinal axis AA of sprue bar assembly 10 and the transverse position of wedge member 30 with wedge base or first surface 32 abutting adjustment surface 26. That is, the transverse position of wedge member 30 determines the span between adjustment surface 26 and wedge seating or second surface 34 along the longitudinal axis AA of sprue bar assembly 10. Overall length of sprue bar assembly 10 is measured with interface member 16 abutting wedge seating or second surface 34. As illustrated in FIGS. 3 and 4a, wedge member 30 is located with a first side of opening 31 abutting stud portion 24 whereby wedge seating or second surface 34 is at a position establishing the minimum overall length of sprue bar assembly 10. In FIG. 4b, wedge member 30 is at a position with a second (opposite) side of opening 31 abutting the stud portion 24 whereby wedge seating or second surface 34 is at a position establishing the maximum overall length of sprue bar assembly 10. Length adjustment is effected by first loosening fastenings attaching interface member 16 to tubular body 22 to permit wedge member 30 to be repositioned transversely. Lock nuts 33 and 35 are then loosened to permit altering relative projections of bolts 36 and 38 into opening 31. Relative projections of bolts 36 and 38 into opening 31 are then changed to reposition wedge member 30, lock nuts 33 and 35 are re-tightened and fastenings attaching interface member 16 to tubular body 22 are re-tightened to complete adjustment of overall sprue bar assembly length.

Figure 6A:
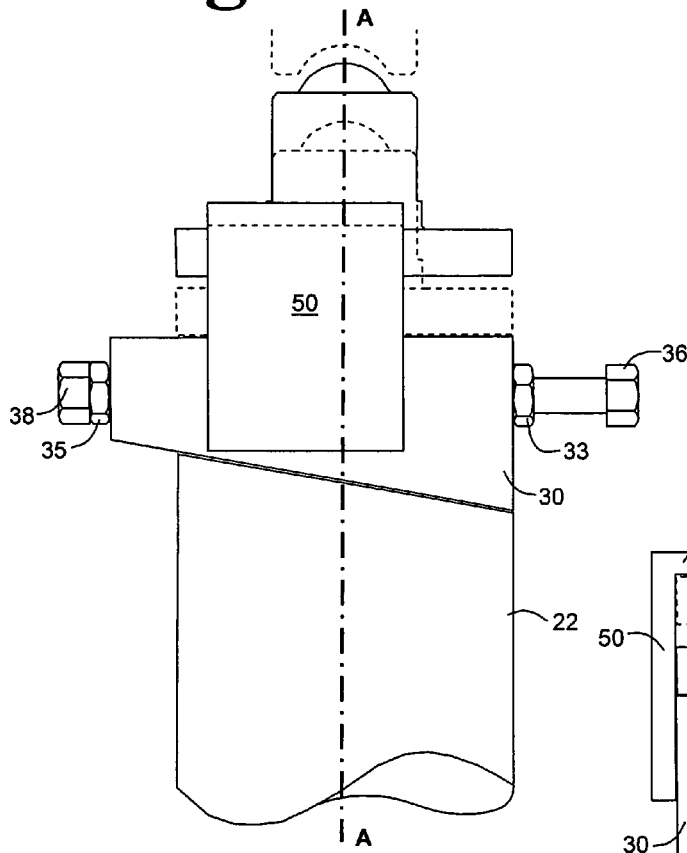
FIGS. 6a and 6b are side views of the sprue bar assembly of FIGS. 5a and 5b.
Figure 6B:
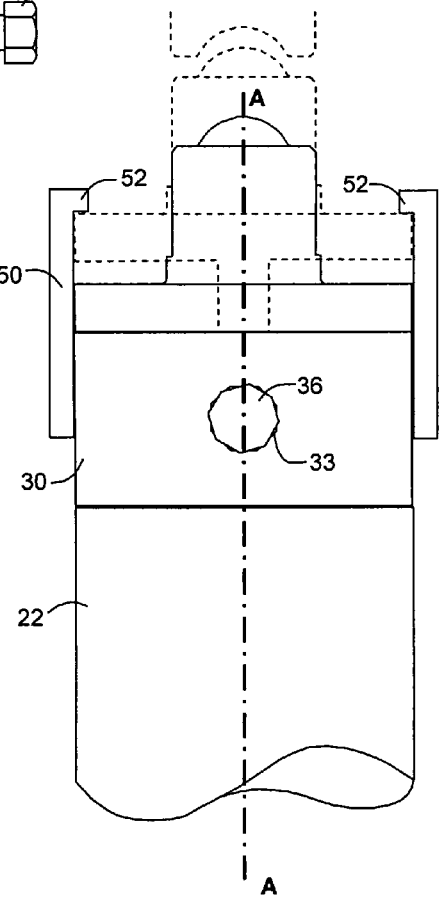

Referring to FIGS. 5a and 5b, an interface member 16 extendable relative to tubular body 22 is illustrated in a seated position. The extendable interface member is effective to reduce leakage of melt from sprue bar assembly 10 upon separation of mating mold components, the extendable interface member being maintained in sealed engagement with a mating mold interface member upon initial separation of mating mold components. FIGS. 5a and 5b illustrate alternative stroke limiting means for establishing the maximum separation of interface member 16 from wedge seating or second surface 34: first alternative stroke limiting means comprise extended fasteners, such as bolts 47 and 49 (shown dashed in FIG. 5a, solid in FIG. 5b) passing through clearance holes in flange 46 and threaded into tubular body 22; and, second alternative stroke limiting means comprise stroke limiting stop plates such as stop plate 50 (shown solid in FIG. 5a, dashed in FIG. 5b) attached to wedge member 30 (see FIG. 6a). Heads 57 and 59 of bolts 47 and 49, respectively, abut flange 46 to establish the maximum span of separation of interface member 16 from wedge seating or second surface 34. Alternatively, capture rails, such as capture rail 52, of the alternative stroke limiting stop plates 50 are arranged to project into the path of flange 46 establishing the maximum span of separation of interface member 16 from wedge seating or second surface 34 as illustrated in FIG. 6b. Whether first or second alternative stroke limiting means are used, interface member 16 extends along longitudinal axis AA of sprue bar segment 12 as a consequence of shank portion 42 sliding within passage 14. FIGS. 6a and 6b illustrate the extended and seated positions of interface member 16: in FIG. 6a, the extended position being shown with solid lines, the seated position being shown with dashed lines; and, in FIG. 6b, the extended position being shown with dashed lines and the seated position being shown in solid lines. In FIGS. 6a and 6b, the mating mold interface member that interface member 16 engages in a sealing manner is shown in dashed lines separated from sealing surface 45.

Although illustrated with the first surface 32 of the wedge member abutting an adjustment surface 26 comprising the tubular body, the first surface 32 of wedge member 30 could abut an oblique surface of the interface member and the second surface 34 of the wedge member could abut a surface of the tubular body perpendicular to the longitudinal axis AA. Although illustrated as an integral feature of tubular body 22, adjustment surface 26 may be an element of a member surrounding stud portion 24 and attached to tubular body 22 so as to provide the appropriate oblique surface for abutting first surface 32 of wedge member 30. In an arrangement where the first surface 32 of wedge member 30 abuts an oblique surface of interface member 16, such oblique surface could comprise an element of a second wedge member attached to interface member 16 so as to provide an adjustment surface 26 interposed between the first surface 32 and flange 46 and surrounding shank portion 42 of interface member 16. Heating devices, such as heater bands and so called "cartridge" heaters as are known, may be applied externally or internally to the sprue bar-nozzle assembly to maintain melt retained therein in a flowable condition. Other additions and substitutions of elements known to those skilled in the art may be applied to the nozzles and apparatus herein shown and described without departing form the spirit and scope of the invention as claimed.

V. INDUSTRIAL APPLICABILITY

The present invention overcomes disadvantages of known arrangements for stack molds wherein apparatus such as sprue bars for supplying melt to stacked mold assemblies are designed for a particular mold shut height and are not suitable for use with mold assemblies that do not conform to that mold shut height. The invention provides apparatus with length adjusting devices permitting accommodation of a range of mold shut heights. Apparatus in accordance with the invention permits adjustment of sprue bar assembly length to accommodate a range of mold assembly shut height that may result from dimensional changes from mold refurbishing or from substitution of mating mold components in mold assemblies. By providing length adjustment, costs of supplying alternative apparatus or of modifying apparatus to accommodate differences in mold assembly shut height can be avoided.

What is claimed is:

1. Apparatus for conveying melt to mold cavities, the mold cavities being defined by plural pairs of mating mold components, each mating mold component comprising a mold assembly, plural mold assemblies being supported so that mating mold components of the plural mold assemblies are simultaneously abutted and separated by movement of supports in a direction parallel to a mold longitudinal axis and the apparatus being abutted with and separated from at least one mating mold member with abutment and separation of mating mold components, the apparatus comprising at least one tubular body having a passage there through providing fluid communication between a source of melt and a plurality of mold cavities, an interface member mounted to at least one tubular body at a terminus of the passage for engaging a mating mold member and having a nozzle passage there through for conducting melt between the tubular body and the mating member, and a length adjusting device interposed between the interface member and the tubular body, the length adjusting device comprising a wedge member having a wedge first surface oblique to the longitudinal axis of the tubular body for abutting an adjustment surface and a wedge second surface perpendicular to the longitudinal axis of the tubular body, and means for setting the transverse position of the wedge member relative to the longitudinal axis of the tubular body to establish the position of the wedge second surface relative to the adjustment surface whereby the overall length of the combined tubular body and interface member is established.

2. The apparatus of claim 1 wherein the wedge member comprises an opening through which a stud portion of the tubular body proximate a terminus of the passage passes and the means for setting the transverse position of the wedge member comprises at least two screws threadably engaged with the wedge member and projecting through opposed sides of the opening transverse to the axis of adjustment of the wedge member to abut the stud portion, the transverse position of the wedge member being established by the relative extent of projection of the screws between the opposed sides of the opening and the stud portion.

3. The apparatus of claim 2 wherein the first surface of the wedge member abuts an oblique surface on the tubular body proximate the terminus of the passage and the interface member is fixed to the apparatus to abut the second surface of the wedge member.

4. The apparatus of claim 3 wherein the interface member comprises a nozzle for changing the rate of flow of melt proximate the terminus of the passage.

5. The apparatus according to claim 4 wherein the nozzle comprises a shank portion received within the passage at the stud portion, a nose portion for sealing engagement with a mating member when mating mold components are abutted, the nozzle passage being open at the shank portion and the nose portion, and a flange intermediate the shank portion and the nose portion, the flange abutting the second surface of the wedge member.

6. The apparatus according to claim 5 wherein the nose portion comprises a convex surface surrounding the nozzle passage, the convex surface engaging a mating concave surface in a sealed manner when mating mold components are abutted.

7. The apparatus according to claim 5 wherein the nose portion comprises a concave surface surrounding the nozzle passage, the concave surface engaging a mating convex surface in a sealed manner when mating mold components are abutted.

8. The apparatus of claim 2 wherein the interface member is mounted to the tubular body so as to be extendible relative thereto and the apparatus further comprises an interface member stroke limiter affixed to the wedge member, the stroke limiter establishing the maximum extension of the interface member relative to the tubular body, the interface member abutting the wedge member when not extended, whereby the wedge member establishes the overall length of the tubular body and interface member with the interface member not extended relative to the tubular body.

9. The apparatus according to claim 8 wherein the interface member comprises a nozzle for changing the rate of flow of melt proximate the terminus of the passage.

10. The apparatus according to claim 9 wherein the nozzle comprises a shank portion received within the passage at the stud portion, a nose portion for sealing engagement with a mating member when mating mold components are abutted, the nozzle passage being open at the shank portion and the nose portion, and a flange intermediate the shank portion and the nose portion, the flange abutting the seating surface of the wedge member.

11. The apparatus according to claim 10 wherein the nose portion comprises a convex surface surrounding the nozzle passage, the convex surface engaging a mating concave surface in a sealed manner when mating mold components are abutted.

12. The apparatus according to claim 10 wherein the nose portion comprises a concave surface surrounding the nozzle passage, the concave surface engaging a mating convex surface in a sealed manner when mating mold components are abutted.

13. A sprue bar assembly for conducting melt to mold cavities, the mold cavities being defined by plural pairs of mating mold components, each mating mold component comprising a mold assembly, plural mold assemblies being supported so that mating mold components are simultaneously abutted and separated by movement of supports in a direction parallel to a mold longitudinal axis and the sprue bar assembly is abutted with and separated from a mating member with abutment and separation of mating mold components, the sprue bar assembly comprising a sprue bar segment, a nozzle and a length adjusting device interposed between the nozzle and the sprue bar segment, the sprue bar segment comprising a tubular body having a passage there through providing fluid communication between a source of melt and said plurality of mold cavities, the nozzle having a nozzle passage there through for conducting melt between the sprue bar assembly and a mating mold interface member engaged by the sprue bar assembly when mating mold components are abutted, a shank portion received in the passage, a nose portion for engaging a mating mold interface member when mating mold components are abutted and a flange intermediate the nose portion and the shank portion, the length adjusting device comprising a wedge member having a wedge first surface oblique to the axis of adjustment for abutting an adjustment surface, the adjustment surface being oblique to the longitudinal axis of the sprue bar assembly, a wedge second surface perpendicular to the axis of adjustment and means for setting the transverse position of the wedge member relative to the longitudinal axis of the sprue bar assembly to establish the position of the second surface relative to the adjustment surface, whereby the overall length of the sprue bar assembly is established by setting the transverse position of the wedge member relative to the longitudinal axis of the sprue bar assembly.

14. The sprue bar assembly according to claim 13 wherein the wedge member comprises an opening through which a stud portion of the tubular body proximate a terminus of the passage passes and the means for setting the transverse position of the wedge member comprises at least two screws threadably engaged with the wedge member and projecting through opposed sides of the opening there through transverse to the axis of adjustment of the wedge member to abut the stud portion, the transverse position of the wedge member being established by the relative extent of projection of the screws between the opposed sides of the opening and the stud portion.

15. The sprue bar assembly according to claim 13 wherein the nozzle is fixed to the sprue bar segment with the flange seated against the wedge second surface.

16. The apparatus according to claim 15 wherein the nose portion comprises a convex surface surrounding the nozzle passage, the convex surface engaging a mating concave surface in a sealed manner when mating mold components are abutted.

17. The apparatus according to claim 15 wherein the nose portion comprises a concave surface surrounding the nozzle passage, the concave surface engaging a mating convex surface in a sealed manner when mating mold components are abutted.

18. The sprue bar assembly according to claim 13 wherein the nozzle is attached to the sprue bar segment to be extendible relative to the sprue bar segment and the sprue bar assembly further comprises a stroke limiter for establishing the maximum extension of the nozzle.

19. The apparatus according to claim 18 wherein the nose portion comprises a convex surface surrounding the nozzle passage, the convex surface engaging a mating concave surface in a sealed manner when mating mold components are abutted.

20. The apparatus according to claim 18 wherein the nose portion comprises a concave surface surrounding the nozzle passage, the concave surface engaging a mating convex surface in a sealed manner when mating mold components are abutted.

* * * * *